(12) United States Patent
Greber et al.

(10) Patent No.: US 10,557,394 B2
(45) Date of Patent: Feb. 11, 2020

(54) EXHAUST HEAT RECOVERY DEVICE HAVING AN IMPROVED TIGHTNESS

(71) Applicant: Faurecia Systemes D'Echappement, Nantere (FR)

(72) Inventors: Frederic Greber, Ecot (FR); Yong-Hwan Oh, Ansan (SK)

(73) Assignee: Faurecia Systemes D'Echappement (FR)

( * ) Notice: Subject to any disclaimer, the term of this patent is extended or adjusted under 35 U.S.C. 154(b) by 0 days.

(21) Appl. No.: 15/442,997

(22) Filed: Feb. 27, 2017

(65) Prior Publication Data
US 2018/0163602 A1    Jun. 14, 2018

(51) Int. Cl.
*F01N 5/02*   (2006.01)
*F01N 3/02*   (2006.01)
*F16K 1/20*   (2006.01)

(52) U.S. Cl.
CPC ............. *F01N 5/02* (2013.01); *F01N 3/0205* (2013.01); *F16K 1/2042* (2013.01); *F01N 2240/02* (2013.01); *F01N 2240/36* (2013.01); *F01N 2390/00* (2013.01); *F01N 2410/00* (2013.01); *Y02T 10/16* (2013.01); *Y02T 10/20* (2013.01)

(58) Field of Classification Search
CPC .... F01N 5/02; F01N 2240/02; F01N 2240/20; F16K 1/2042; F16K 1/205; F16K 1/22; F23J 13/08
See application file for complete search history.

(56) References Cited

U.S. PATENT DOCUMENTS

| | | | | |
|---|---|---|---|---|
| 4,742,766 A | * | 5/1988 | Davison | F01N 13/085 454/2 |
| 4,821,629 A | * | 4/1989 | Davison | F01N 13/085 454/2 |
| 7,198,037 B2 | * | 4/2007 | Sayers | F02M 26/26 123/568.12 |
| 9,759,118 B2 | | 9/2017 | Tabares et al. | |
| 2004/0182440 A1 | * | 9/2004 | Watts | F16K 1/22 137/375 |

(Continued)

FOREIGN PATENT DOCUMENTS

JP   2009209913 A  *  9/2009
JP   2015031250 A      2/2015

(Continued)

OTHER PUBLICATIONS

Search Report for French Application No. 1662229, dated Jun. 7, 2017.

*Primary Examiner* — Audrey K Bradley
(74) *Attorney, Agent, or Firm* — Carolson, Gaskey & Olds, P.C.

(57) ABSTRACT

A heat recovery device extends between an inlet and an outlet for exhaust gas, and includes a valve delimiting a direct passage for gas between the inlet and the outlet. The valve comprises a valve body housing a gate movable between a closing off position and a released position. A heat exchanger has an exchanger inlet upstream of the gate and an exchanger outlet downstream of the gate. The valve comprises a tube partially extending inside the valve body up to a mouth edge at a distal end, with the mouth edge extending in a plane. The gate has a plane contact surface configured to come in a direct contact with the mouth edge when the gate is in the closing off position.

14 Claims, 2 Drawing Sheets

(56) References Cited

U.S. PATENT DOCUMENTS

| | | |
|---|---|---|
| 2004/0251012 A1 | 12/2004 | Bush et al. |
| 2005/0051322 A1 | 3/2005 | Speer |
| 2008/0011866 A1 | 1/2008 | Le Lievre |
| 2009/0049832 A1* | 2/2009 | Hase .................. F01N 5/02 60/320 |
| 2016/0010531 A1* | 1/2016 | Dominguez et al. ... F01N 3/043 60/320 |
| 2018/0003097 A1* | 1/2018 | Godard .................. F01N 5/02 |

FOREIGN PATENT DOCUMENTS

| | | |
|---|---|---|
| JP | 2016044666 A | 4/2016 |
| KR | 20110037547 A | 4/2011 |
| WO | 2016107899 A1 | 7/2016 |

\* cited by examiner

EXHAUST HEAT RECOVERY DEVICE HAVING AN IMPROVED TIGHTNESS

CROSS-REFERENCE TO RELATED APPLICATIONS

This application claims priority to FR 16 62229, filed Dec. 9, 2016.

FIELD OF THE INVENTION

The present invention relates to an exhaust heat recovery device, in particular for a motor vehicle.

BACKGROUND

The thermal energy contained in exhaust gases represents about 30% of the energy contained in the fuel. A heat recovery device is intended to transfer this energy to another fluid, such as an engine coolant or oil.

Already known in the state of the art, in particular according to FR 3,031,140, is a heat recovery device for an exhaust line, extending between an exhaust gas inlet and outlet, and including a valve defining a gas passage toward the exhaust gas outlet. The device houses a gate that is movable around a pivot link between a closing off position and a free position of the passage. The device further includes a heat exchanger comprising an exchanger inlet communicating with the valve upstream from the gate, and an exchanger outlet communicating with the valve downstream from the gate.

The heat exchanger is intended to allow the exchange of heat between the exhaust gases, passing through this heat exchanger, and a heat transfer fluid, in particular a coolant.

When the gate is in the closing off position, the circulation of the exhaust gases is forced from the inlet toward the gas outlet through the heat exchanger. When the gate is in the free position, the exhaust gases circulate through the passage defined by the valve, the exchanger then being inactive.

In such a device, the gate bears against a seat formed by a flat shell arranged in the valve.

This shell is welded in the valve, such that there is a risk of this shell deforming under the effect of the heat given off by the welding. In this case, the tightness between the shell and the valve in the closing off position is sometimes not correctly provided.

Also known in the state of the art, in particular according to JP 2016 044 666 A, is a heat recovery device in which the seat for the gate is supported by a conical shell, the gate then having a complementary conical shape. The conical shell is also welded in the valve.

Tightness is also difficult to provide in this device, since the conical shell also risks being deformed when it is welded in the valve, and the shape of the gate is difficult to obtain. The shape is also potentially subject to deformation during the design of the gate. Yet any deformation of the shell or gate modifies the relative position of the shell and this gate, which then results in leaks.

SUMMARY

The invention in particular aims to resolve these drawbacks by proposing a heat recovery device with improved tightness.

To that end, the invention, in particular, relates to a device for recovering exhaust heat and which extends between an exhaust gas inlet and outlet. The device includes a valve defining a direct gas passage between the exhaust gas inlet and an outlet. The valve comprises a valve body including the gas outlet and housing a gate that is movable around a pivot link between a closing off position and a free position of the passage. The device further includes a heat exchanger comprising an exchanger inlet communicating with the valve upstream from the gate, and an exchanger outlet communicating with the valve downstream from the gate. The valve includes a tube comprising the exhaust gas inlet, where the tube extends partially inside the valve body, up to a distal end mouth edge, and with the mouth edge extending in a plane.

The gate has a planar contact surface that is configured to come into direct contact with the mouth edge of the tube when the gate is in the closing off position.

According to one example of the invention, the mouth edge of the tube is planar and the gate is planar to obtain a plane/plane contact, for which the tightness is easy to control.

The mouth edge is generally obtained by cutting the tube, in particular by using laser cutting. Any potential deformation of this tube, when it is assembled in the valve, does not modify the flatness of the mouth edge.

Thus, the effects of the multiple welding operations necessary to mount the recovery device only marginally affect the tightness.

Furthermore, the planar gate is easy to design, such that the risks of deformation of the gate during its design are very limited.

A heat recovery device according to the invention can further comprise one or more of the following features, considered alone or in any technically possible combinations.

The recovery device includes an intermediate pipe extending between the tube and the heat exchanger.

The recovery device includes, at an inlet of the intermediate pipe, an upstream deflector able to guide the gas coming from the gas inlet toward the passage.

The upstream deflector is formed by a part of the intermediate pipe that extends in the tube.

The recovery device comprises a downstream deflector, arranged in the tube downstream from the inlet of the intermediate pipe. The downstream deflector is, for example, formed by part of the intermediate pipe.

The recovery device comprises a downstream deflector that is arranged in the tube downstream from the inlet of the intermediate pipe. The upstream deflector advances in the tube over a height greater than that of the downstream deflector.

The tube extends along a longitudinal axis, the mouth edge extending in a plane forming an angle comprised between 60° and 90° with the longitudinal axis, for example an angle equal to 60° or equal to 90°.

The tube has an oblong cross-section.

The pivot link bearing the gate is formed by two aligned half-articulations arranged on either side of the tube, with the pivot link having an axis passing through the tube.

The gate includes a metal rib configured to come into contact with the mouth edge of the tube.

The gate includes a riser.

The riser is configured to obstruct the exchanger outlet when the gate is in the released position, with the exchanger outlet preferably being provided with an adjusted ring reducing a space available for the gas at the exchanger outlet when the gate is in the released position.

The riser has a curved shape and is configured to obstruct the exchanger outlet when the gate is in a predefined intermediate position between the closing off position and the released position.

The invention also relates to a method for manufacturing a recovery device as previously defined, the method comprising the steps of: providing the tube, mounting a gate support on the tube, assembling the gate on the gate support, with the pivot link being mounted with play, positioning the gate in the closing off position in direct contact with the mouth edge, and setting a position of the pivot link relative to the gate support in light of the positioning of the gate in the closing off position.

BRIEF DESCRIPTION OF THE DRAWINGS

The invention will be better understood upon reading the following description, provided solely as an example and done in reference to the appended figures, in which.

DETAILED DESCRIPTION

Figure 1:
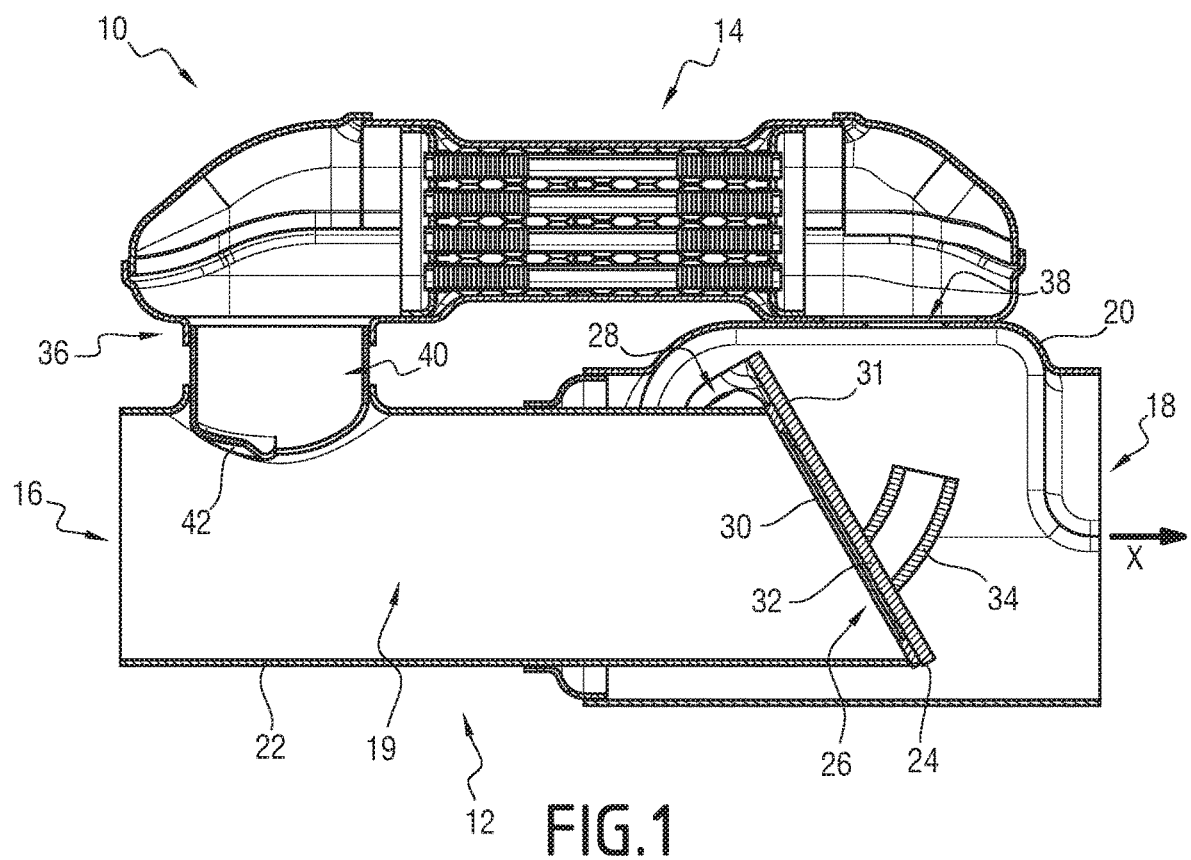
FIGS. 1 and 2 are longitudinal sectional views of a heat recovery device according to one example embodiment of the invention, comprising a gate in a closing off position and a released position, respectively.
Figure 2:
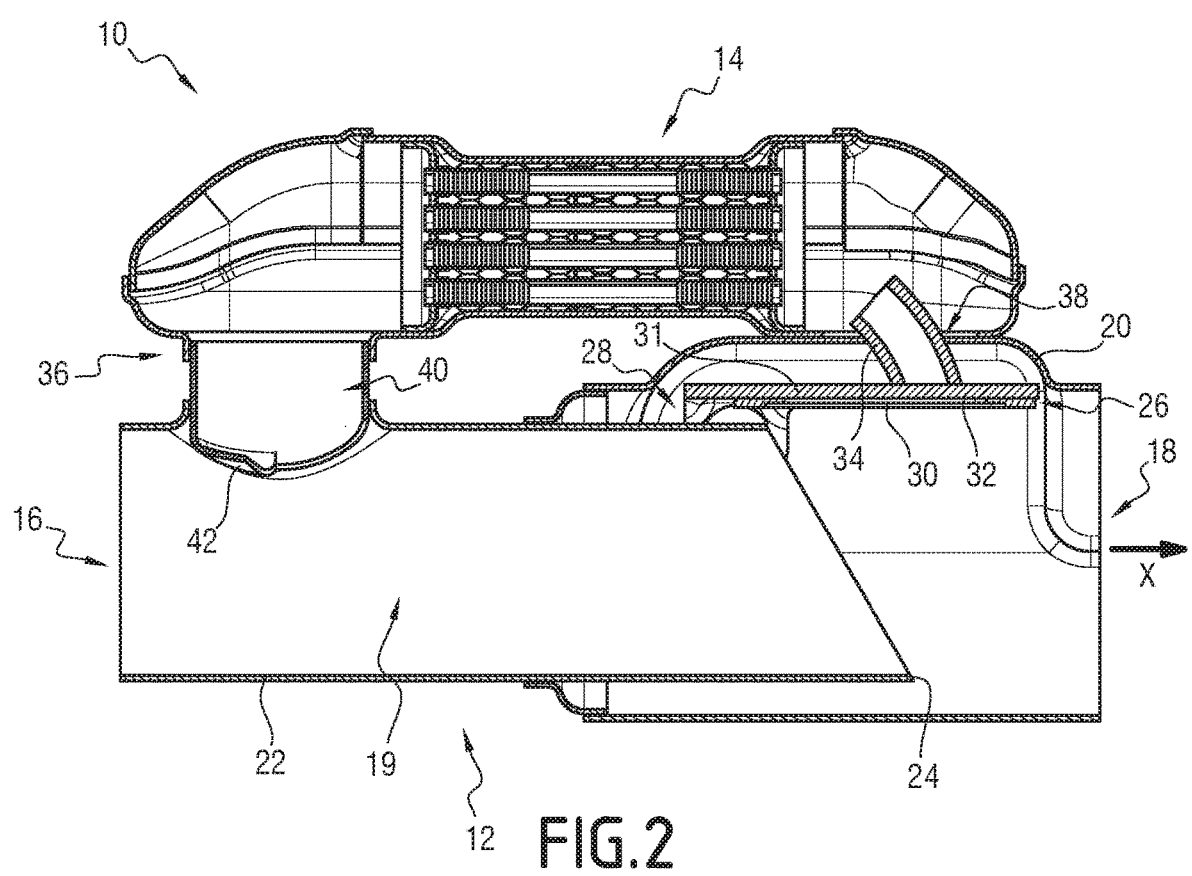

FIGS. 1 and 2 show a heat recovery device 10, intended to be inserted in an exhaust line of a vehicle, typically a motor vehicle, for example a car or truck.

The recovery device 10 is intended to recover part of the thermal energy from the exhaust gases and to transfer it to a heat transfer fluid, for example to an engine coolant, or a heating circuit of the passenger compartment.

The recovery device 10 includes a valve 12 and a heat exchanger 14, arranged in parallel.

The valve 12 has an exhaust gas inlet 16 and an exhaust gas outlet 18. The valve 12 inwardly defines a direct passage 19 for the exhaust gases, from the inlet 16 to the outlet 18.

The valve 12 includes a valve body 20 including the outlet 18, and a tube 22 extending partly in the valve body 20, and which comprises the inlet 16.

Figure 3:
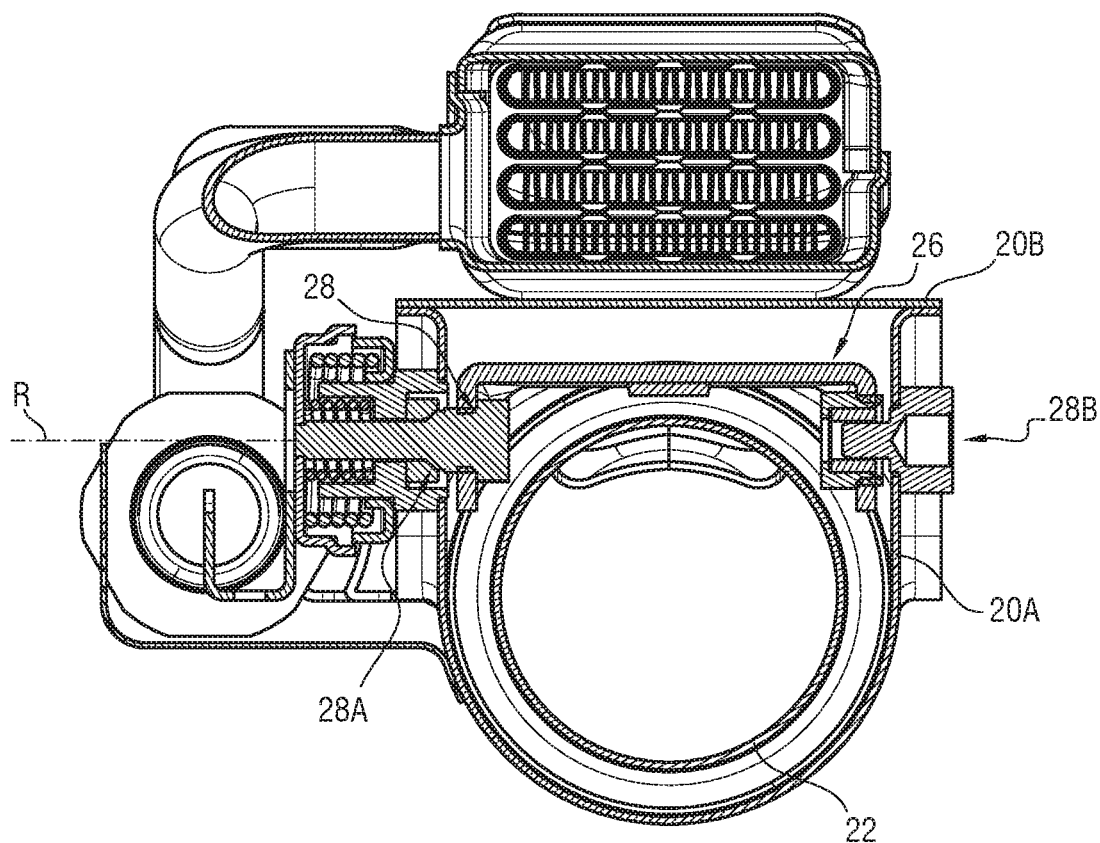
FIG. 3 is a cross-sectional view of the recovery device of FIG. 1, in a plane including a pivot link supporting a gate.

The valve body 20 is, for example, made up of two elements, which are a lower half-shell 20A and an upper half-shell 20B (in particular shown in FIG. 3). These lower 20A and upper 20B half-shells each include a flat contour. These half-shells 20A, 20B are assembled to one another by superimposing these flat contours. A "flat on flat" welding makes it possible to assemble them traditionally.

In the described example, the tube 22 has a circular cross-section. However, alternatively, the tube 22 has an oblong cross-section. An oblong tube makes it possible to reduce the height of the device 10. Such an oblong tube can be obtained by assembling two half-tubes cut lengthwise, or using a hydroforming method from a tube with a circular section.

The tube 22 includes a distal end mouth edge 24, arranged in the valve body 20. This mouth edge 24 is at the end of the part of the tube 22 extending in the valve body 20.

The mouth edge 24 extends completely in a plane. For example, this plane is inclined relative to a longitudinal direction X, along which the tube 22 extends, by an angle advantageously comprised between 60 and 90°.

The valve 12 also includes a gate 26, movable around a pivot link 28 between a closing off position (shown in FIG. 1) and a released position (shown in FIG. 2) of the passage 19. The pivot link 28 is supported by an attached support element.

As shown in FIG. 3, the pivot link 28 is, for example, formed by two aligned half-articulations 28A, 28B, arranged on either side of the tube 22, with the pivot link 28 having an axis R passing through the tube 22. This arrangement of the pivot link 28 makes it possible to reduce the height of the valve body 20.

The half-articulations 28A, 28B are each supported by the valve body 20, and more particularly by the lower half-shell 20A.

Advantageously, the pivot link 28 is slightly offset toward the inlet 16 relative to the end edge 24, the gate 26 then being offset relative to the axis R.

Thus, for a same opening angle, the opening between the gate 26 and the mouth edge 24 is larger when the pivot link 28 is offset than in the case of a pivot link arranged in the plane of the mouth edge 24. Furthermore, the gate 26 bearing such an offset pivot link 28 is less sensitive to the pulses of the exhaust gases than a gate whose pivot link is arranged in the plane of the mouth edge 24.

The gate 26 has a planar contact surface 30, intended to come into direct contact with the mouth edge 24 of the tube 22 when the gate 26 is in the closing off position. "Direct contact" means that the gate rests directly on the mouth edge 24, without this mouth edge 24 carrying an additional intermediate element.

The gate 26 is actuated traditionally using a lever, secured to this gate 26, the lever being moved by a traditional actuator mechanism, for example wax or an electric actuator.

It should be noted that the angle between the plane of the mouth edge 24 and the longitudinal direction X is preferably substantially equal to 60° when the device includes a wax actuator, and preferably substantially equal to 90° when the device includes an electric actuator.

An angle of 90° is also advantageous in that it does not require paying particular attention to the angular position of the tube 22 during the assembly of the device 10.

The gate 26 allows surface bearing over the entire surface formed by the mouth edge 24, on the periphery of the tube 22, which makes it possible to guarantee the geometry of the bearing surface. Indeed, the latter is only very slightly or not at all sensitive to the deformations caused during the assembly by welding. Advantageously, the tube 22 has a thickness substantially equal to 2 mm, so as to have a large bearing surface.

The gate 26 includes a planar structural element 31, supported by the pivot link 28. As previously stated, the pivot link 28 is offset relative to this planar structural element 31. In other words, the axis R does not pass through this planar structural element 31.

Advantageously, the gate 26 includes a shock absorbing element 32, for example a metal rib 32, intended to come into contact with the mouth edge 24 of the tube 22. Thus, in this case, the shock absorbing element 32 bears the planar contact surface 30. Such a metal rib 32 is assembled by spot welding to the structural element 31.

The shock absorbing element 32 is intended to limit the noise due to the impact between the gate 26 and the mouth edge 24 when the gate 26 goes to the closing off position. The shock absorbing element 32, in particular when it is made up of a metal rib, can be a slight source of leaks between the tube 22 and the valve body 20, but such leaks are very limited, and negligible. Such leaks are in particular much smaller than the leaks observed in the devices of the state of the art.

Advantageously, the gate 26 also includes a riser 34 that is supported by the structural element 31, and which is opposite the contact surface 30. This riser 34 makes it possible to increase the mass of the gate 26, and thus to reduce the specific frequency of the gate 26, then decreasing its sensitivity to the pulses of the exhaust gases, and therefore reducing the vibrations of the gate 26.

The heat exchanger 14 comprises an exchanger inlet 36 communicating with the valve 12 upstream from the gate 26, and an exchanger outlet 38 communicating with the valve 12 downstream from the gate 26. Thus, the exchanger inlet 36 communicates with the tube 22 and the exchanger outlet 38 communicates with the valve body 20.

Advantageously, the riser 34 of the gate 26 is configured to close off the exchanger outlet 38 when the gate 26 is in the released position.

For example, the riser 34 has a curved general shape protruding from the structural element 31. Thus, the riser 34 closes off the exchanger outlet 38 when an intermediate position of the gate 26 between the closing off position and the released position is reached. In this case, the exchanger outlet 38 is therefore closed off even when the travel of the gate 26 is not complete, for example when the device includes a wax actuator.

The riser 34 is, for example, configured to begin closing off the exchanger outlet 38 once an opening angle of the gate of 28° is reached. Indeed, a wax actuator age is dependent on the number of actuations, such that although when new, the opening angle is 38°, this opening angle is only 28° at the end of their life.

Thus, when a transition temperature is reached in a coolant circuit, the bowed riser 34 of the gate 26 is inserted in the exchanger outlet opening 38. Advantageously, this exchanger outlet 38 is provided with an adjusted ring reducing the space available for the gas at the exchanger outlet 38 when the gate 26 is opened. Thus, when the exchanger outlet 38 is almost completely closed off, the gases necessarily pass through the tube 22 and the valve body 20 while avoiding the exchanger 14.

In the described example, the recovery device 10 includes an intermediate pipe 40 extending between the tube 22 and the exchanger inlet 36. This intermediate pipe 40 extends transversely relative to the longitudinal direction X.

Advantageously, the recovery device 10 comprises, at the inlet of the intermediate pipe 40, an upstream deflector 42 able to guide the gas coming from the gas inlet 16 toward the passage 19. This upstream deflector 42 makes it possible to ensure that the gas coming from the gas inlet 16 passes through the passage 19 when the gate 26 is in the released position.

For example, the upstream deflector 42 is formed by a part of the intermediate pipe 40, which extends in the tube 22. An excess length of this intermediate pipe 40 is deformed to form the upstream deflector 42.

Advantageously, the upstream deflector 42 extends in the tube 22 to a height comprised between 2 and 10 mm.

Figure 4:
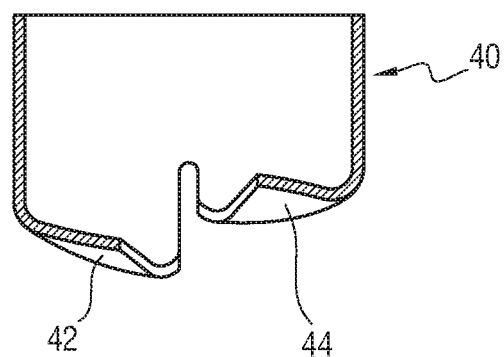
FIG. 4 is a view in the same cutting plane of FIGS. 1 and 2 of an intermediate pipe of the recovery device of these FIGS. 1 and 2, according to one alternative embodiment.

According to an alternative shown in FIG. 4, the recovery device 10 comprises a downstream deflector 44, arranged in the tube 22 downstream from the inlet of the intermediate pipe 40, and therefore downstream from the upstream deflector 42. This downstream deflector 44 further decreases the gas flow passing through the exchanger 14 when the gate 26 is in the released position, limiting the section of the opening toward the intermediate pipe 40. This downstream deflector 44 also limits the vortex creation downstream from the upstream deflector 42, thus decreases the flow rate of the gases toward the exchanger 14.

Advantageously, the upstream deflector 42 advances in the tube 22 over a height greater than that of the downstream deflector 44. In other words, the upstream deflector 42 is closer to the center of the tube 22 than the downstream deflector 44. Thus, the gas deflected by the upstream deflector 42 is not deflected by the downstream deflector 44 toward the intermediate pipe 40.

For example, the downstream deflector 44 extends in the tube 22 to a height comprised between 2 and 5 mm.

According to one alternative, the upstream deflector 42 and/or the downstream deflector 44 is integral with the tube 22, and obtained by deformation of this tube 22.

According to another alternative, the upstream deflector 42 and/or the downstream deflector 44 is formed by a part attached between the tube 22 and the intermediate pipe 40.

The operation of the heat recovery device 10 according to the invention will now be described.

The recovery device 10 works using two operating modes, namely an energy recovery mode and a short-circuit mode.

The recovery device 10 is in the energy recovery mode when the temperature of the coolant is below an activation threshold of the actuator. The gate 26 is then in the closing off position, bearing on the mouth edge 24 of the tube 22. The gate 26 thus closes off the passage of the exhaust gases at the end of the tube 22. The exhaust gases coming from the gas inlet 16 are then oriented first through the intermediate pipe 40, then in the gas inlet 36 of the exchanger 14. The exhaust gases traverse the exchanger 14, and then through the valve body 20 toward the gas outlet 18.

The recovery device 10 is in the short-circuit mode when the coolant reaches the transition temperature of the actuator. The actuator then rotates the pivot link 28, and consequently the gate 26. The exhaust gases that reach the gas inlet 16 traverse the direct passage 19 toward the valve body 20, and then go through the released opening between the gate 26 and the edge 24.

The riser 34 of the gate 26 then closes off the exchanger outlet 38.

As previously indicated, the upstream deflector 42 makes it possible to limit the passage of part of the gases in the exchanger 14, by deflecting the gas flow toward the lower part of the tube 22. The gases thus naturally tend to follow the tube 22. Furthermore, with the exchanger outlet 38 being substantially closed off, the gas passage through the exchanger 14 is practically blocked.

More particularly, when the exchanger outlet 38 is substantially closed off, the gas flow rate passing through the exchanger is less than 1% of the gas flow rate passing through the tube 22.

As an example, the passage section of the exhaust gases being 60 mm$^2$, the flow rate passing through the exchanger is only 2.4 kg/h at 800° C., compared to a flow rate of 416 kg/h passing through the tube 22. It should be noted that without the deflectors 42 and 44 of the adjusted ring, this flow rate would be 9.7 kg/h.

A method for manufacturing the recovery device 10 will now be described.

This method must ensure the plane/plane contact of the gate 26 in the closing off position with the mouth edge 24.

Thus, the method includes a step for providing the tube 22, the mouth edge 24 of which has previously been formed, for example by cutting the tube 22, in particular by using laser cutting. Thus, the mouth edge 24 is defined in a plane, forming a predefined angle with the longitudinal direction X, for example 60° or 90°.

The next step of the method includes mounting a gate support on the tube 22. In the described example, the gate support is formed by a bearing attached and welded on the valve body 20.

The method next includes assembling the gate 26 on the valve support (valve body 20), the pivot link 28 being mounted with play. This play allows flexibility in the positioning of the gate 26, so as to position this gate 26 optimally.

The method next includes positioning the gate 26 in the closing off position, in direct contact with the mouth edge 24. The gate 26 thus positioned makes it possible to determine the final position of the pivot link 28.

The method lastly includes setting the position of the pivot link 28 relative to the gate support (valve body 20), in light of the positioning of the gate 26 in the closing off position. The position of the pivot link 28 thus set makes it possible to ensure that the gate 26 in the closing off position will be in plane/plane contact against the mouth edge 24.

The rest of the device 10 is next assembled, around the tube 22 and the valve body 20.

It will be noted that the tube 22 has a structural support function in the device 10, since the valve body 20 and the intermediate pipe 40 are mounted on it.

It will be noted that the invention is not limited to the embodiment previously described, and could assume the form of various additional alternatives.

In particular, the general shape of the device 10 could differ from that shown in the Figures.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A recovery device to recover exhaust heat, the recovery device extending between an exhaust gas inlet and a gas outlet, and including:
   a valve defining a direct gas passage between the exhaust gas inlet and the gas outlet, the valve comprising a valve body including the gas outlet and housing a gate movable around a pivot link between a closing off position and a released position of the direct gas passage; and
   a heat exchanger comprising an exchanger inlet communicating with the valve upstream from the gate, and an exchanger outlet communicating with the valve downstream from the gate, wherein:
   the valve includes a tube comprising the exhaust gas inlet, the tube extending partially inside the valve body up to a distal end mouth edge of the tube, the distal end mouth edge extending in a plane,
   the gate has a planar contact surface intended to come into direct contact with the distal end mouth edge of the tube when the gate is in the closing off position,
   the gate includes a riser, and
   wherein the riser is configured to obstruct the exchanger outlet when the gate is in the released position, the exchanger outlet being provided with an adjusted ring reducing a space available for the exhaust gas at the exchanger outlet when the gate is in the released position.

2. The recovery device according to claim 1, including an intermediate pipe extending between the tube and the heat exchanger.

3. The recovery device according to claim 1, wherein the tube extends along a longitudinal axis, the mouth edge extending in a plane forming an angle comprised between 60° and 90° with the longitudinal axis.

4. The recovery device according to claim 1, wherein the tube has an oblong cross-section.

5. The recovery device according to claim 1, wherein the gate includes a metal rib configured to come into contact with the mouth edge of the tube.

6. The recovery device according to claim 1, wherein the riser has a curved shape and is configured to obstruct the exchanger outlet when the gate is in a predefined intermediate position between the closing off position and the released position.

7. The recovery device according to claim 1, wherein the gate rests directly on the distal end mouth edge, without the distal end mouth edge carrying an additional intermediate element.

8. The recovery device according to claim 1, wherein the distal end mouth edge comprises a cut planar surface.

9. A recovery device to recover exhaust heat, the recovery device extending between an exhaust gas inlet and a gas outlet, and including:
   a valve defining a direct gas passage between the exhaust gas inlet and the gas outlet, the valve comprising a valve body including the gas outlet and housing a gate movable around a pivot link between a closing off position and a released position of the direct gas passage; and
   a heat exchanger comprising an exchanger inlet communicating with the valve upstream from the gate, and an exchanger outlet communicating with the valve downstream from the gate, wherein:
   the valve includes a tube comprising the exhaust gas inlet, the tube extending partially inside the valve body up to a distal end mouth edge of the tube, the distal end mouth edge extending in a plane,
   an intermediate pipe extends between the tube and the heat exchanger, and
   the gate has a planar contact surface intended to come into direct contact with the distal end mouth edge of the tube when the gate is in the closing off position and wherein the intermediate pipe has an inlet, the recovery device including, at the inlet of the intermediate pipe, an upstream deflector able to guide the gas coming from the exhaust gas inlet toward the direct gas passage.

10. The recovery device according to claim 9, comprising a downstream deflector arranged in the tube downstream from the inlet of the intermediate pipe.

11. The recovery device according to claim 10, wherein the downstream deflector is formed by part of the intermediate pipe.

12. The recovery device according to claim 9, wherein the upstream deflector is formed by a part of the intermediate pipe that extends in the tube.

13. The recovery device according to claim 12, comprising a downstream deflector, arranged in the tube downstream from the inlet of the intermediate pipe, and in which the upstream deflector advances in the tube over a height greater than that of the downstream deflector.

14. A recovery device to recover exhaust heat, the recovery device extending between an exhaust gas inlet and a gas outlet, and including:

a valve defining a direct gas passage between the exhaust gas inlet and the gas outlet, the valve comprising a valve body including the gas outlet and housing a gate movable around a pivot link between a closing off position and a released position of the direct gas passage; and a heat exchanger comprising an exchanger inlet communicating with the valve upstream from the gate, and an exchanger outlet communicating with the valve downstream from the gate, wherein:

the valve includes a tube comprising the exhaust gas inlet, the tube extending partially inside the valve body up to a distal end mouth edge of the tube, the mouth edge extending in a plane, and the gate has a planar contact surface intended to come into direct contact with the mouth edge of the tube when the gate is in the closing off position, and wherein the pivot link bearing the gate is formed by two aligned half-articulations arranged on either side of the tube, the pivot link having an axis passing through the tube.

* * * * *

UNITED STATES PATENT AND TRADEMARK OFFICE
CERTIFICATE OF CORRECTION

PATENT NO. : 10,557,394 B2
APPLICATION NO. : 15/442997
DATED : February 11, 2020
INVENTOR(S) : Frederic Greber, Yong-Hwan Oh and Christoph Hossfeld Page 1 of 1

It is certified that error appears in the above-identified patent and that said Letters Patent is hereby corrected as shown below:

On the Title Page

In item (72) the inventors should read as:
Frederic Greber, Ecot, France
Yong-Hwan Oh, Ansan City, South Korea
and
Christoph Hossfeld, Westendorf, Germany Signed and Sealed this
Twentieth Day of October, 2020

Andrei Iancu
*Director of the United States Patent and Trademark Office*